INVENTOR
WILBERT L. SHEVEL, JR.

BY

ATTORNEY 3,209,335
MAGNETIC MEMORY ARRAY

Wilbert L. Shevel, Jr., Peekskill, N.Y., assignor to International Business Machines Corporation, New York, N.Y., a corporation of New York Filed Apr. 24, 1961, Ser. No. 105,114
6 Claims. (Cl. 340—174)

This invention relates to magnetic memories, and more particularly to a three-dimensional magnetic memory array employing two cores per bit in which the cores are partially switched to different remanent states intermediate their limiting remanent states to jointly define and store different binary values.

Heretofore, magnetic memories have been developed employing small toroidal cores made of ferrites exhibiting a rectangular hysteresis loop wherein the binary information stored is defined by the limiting remanent states defined by the D.C. major hysteresis loop. "A Myrabit Magnetic Core Matrix Memory System," by J. A. Rajchman, Proc. IRE, vol. 41, page 1407, 1953. Such memories have suffered from a limitation of speed, in that, as the art has developed, the need for memories capable of operating within cycle times of the order of ten times as fast has been required. To this end, C. J. Quartly proposed a two-dimensional word organized memory employing two cores per bit in an article entitled "A High-Speed Ferrite Storage System," Electronic Engineering, December 1959, pages 756–758, wherein the different binary values stored in a pair of cores are represented by a combination of partially switched states in both cores.

While the combinatorial partially switched state of two cores per bit as proposed by C. J. Quartly, op. cit., does provide a faster memory cycle as compared with other systems, the versatility of the memory is somewhat lost due to the fact that only a two-dimensional system may be fabricated.

What has been found, is a means by which a three-dimensional memory employing the partially switched states of two cores to define a binary bit of information may be constructed to provide an enhanced three-dimensional memory system. Basically each storage cell as contemplated for use in the memory of this invention comprises a first and a second magnetic core each made of material exhibiting different stable states of remanent flux density intermediate and including opposite limiting stable states. Coincident selection and drive windings couple both cores in a similar manner and when energized apply a field of predetermined amplitude and polarity to both cores. A sense winding couples the first core in one sense and couples the second core in an opposite sense, while the first core is provided with a first data input winding and the second core is provided with a second data input winding. Operation of the system is such that coincident energization of the selection and drive windings applies a field to both cores capable of switching both cores to a first intermediate stable state. In storing binary information, one or the other of the data input lines coupling the first and the second core, respectively, is energized to apply a magnetomotive force opposing that applied by the selection and drive windings. The core associated with the data input winding energized is then switched to a second intermediate stable state. Thus the combination of different partially switched states in both cores is utilized to designate the different binary values. Readout is accomplished by conjointly energizing the selection input and drive windings in opposite sense to re-establish both cores in a datum limiting stable state whereby voltages are induced on the output winding whose resultant polarity is determined by which of the two cores is allowed to switch to the first intermediate stable state. Thus a plurality of such binary storage cells is provided for each plane of a memory arranged in columns and rows such that coincident addressing of the selection and drive windings tends to switch both cores of a binary cell in each plane towards the first intermediate stable state, and a pair of data input lines is associated with each plane of the memory with the predetermined ones of the data input lines for each plane of memory properly energized for writing in the different binary values.

Accordingly, it is a prime object of this invention to provide an improved magnetic memory employing partially switched states of two cores for binary bit of information.

It is another object of this invention to provide an improved magnetic memory employing binary storage cells comprising a pair of magnetic cores whose different partially switched states conjointly define the different binary values.

Another object of this invention is to provide a three-dimensional magnetic memory capable of operating in cycle times less than the times heretofore realized by orders of magnitude.

Still another object of this invention is to provide a storage cell for storing binary information comprising a pair of cores wherein different binary values are represented by different intermediate stable states of both cores capable of being employed in a three-dimensional memory.

The foregoing and other objects, features and advantages of the invention will be apparent from the following more particular description or a preferred embodiment of the invention as illustrated in the accompanying drawings.

Figure 1:
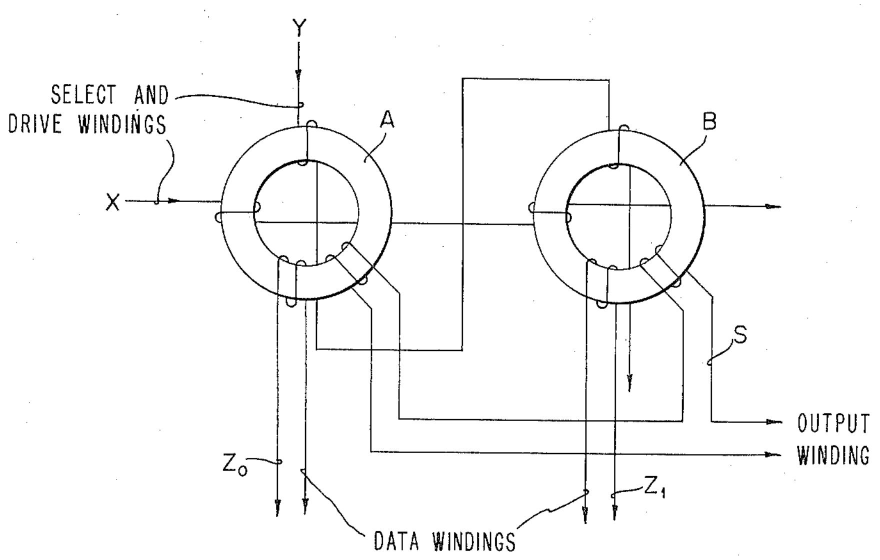
FIGURE 1 is a schematic circuit or a basic binary storage cell according to this invention.
Figure 2:
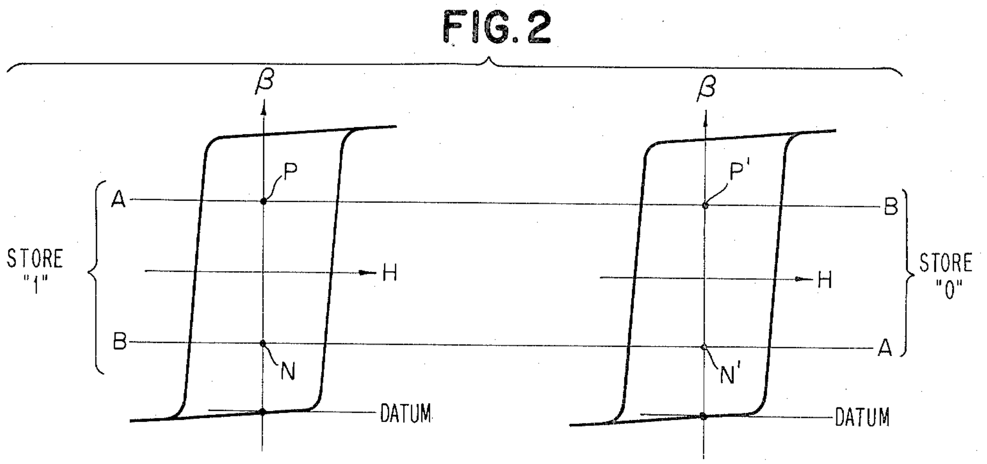
FIGURE 2 is an illustration of the magnetic characteristics of the type material employed in fabrication of the elements in the cell of FIGURE 1.

Referring to the FIGURE 1, a schematic of a basic storage cell for storing a binary bit of information is shown comprising a pair of magnetic cores A and B, each of which may take the familiar toroidal form well-known in the art. Both the cores A and B are made of similar type magnetic material exhibiting a substantially rectangular hysteresis characteristic as is shown in the FIGURE 2. Referring to the FIGURE 2, a pair of hysteresis loops is shown one for each core A and B, each of which is a plot of flux density versus applied field. The hysteresis loop for each core A and B exhibits opposite limiting states of remanent flux density, one of which is labelled "datum state" and a plurality of intermediate stable states labelled N and P.

Referring again to the FIGURE 1, a pair of select and drive windings labelled X and Y couple both the cores A and B in the same sense while an output winding, labelled S, couples the core A in one sense and couples the core B in an opposite sense so that voltages induced in this winding due to a change of flux in the cores A and B in the same sense, oppose one another. Each core A and B is coupled by an individual data input winding $Z_1$ and $Z_0$, respectively. Initially, both cores A and B are set to a datum stable state as indicated in the FIGURE 2 by energization of both the X and Y windings coincidently with negative polarity impulses. Energization of both the X and Y select and drive windings coincidently with positive polarity impulses applies a total M.M.F. to both the cores A and B whose M.M.F.-time product is capable of switching the cores A and B to the P stable state only. Information is then written into the storage cell of FIGURE 1 by either opposing the field applied by the X and Y select and drive windings in the core A to write a binary 0 or in the core B to write a binary 1. Writing is thus accomplished by either energizing the $Z_1$ winding coupling the core A only or by energizing the $Z_0$ winding coupling the core B only to apply an M.M.F. in opposition to that applied when both the windings X and Y are energized. Thus, a binary 1 is represented by the core A being established in the P stable state while the core B is established in the N stable state, while a binary 0 is represented by the core A being established in the N stable state, while the core B is established in the P stable state. Information is thereafter read out by re-establishing both cores A and B in the datum stable state by coincidently energizing the X and Y select and drive winding with negative polarity impulses. On re-establishing the cores A and B in the datum stable state, a positive voltage due to the flux change of the core A switching from the P stable state to the datum stable is induced on the sense winding S, which is opposed by a negative voltage induced on the sense winding due to the flux change of the core B switching from the N stable state to the datum stable state. Since the flux change and hence the voltage induced on the output winding S due to the core A switching from the P stable state to the datum stable state is much larger than the flux change and hence the voltage induced on the output winding S due to the core B switching from the N stable state to the datum stable state, the sum of the voltages induced on the output winding S is thus positive. With a binary 0 stored in the storage cell of cores A and B, the flux change, and hence the voltage induced on the output winding S due to the core B switching from the P stable state to the datum stable state is greater than the flux change and hence the voltage induced on the output winding S due to the core A switching from the N stable state to the datum stable state to thus provide a negative output pulse on the output winding S. Thus, upon readout, a positive voltage is induced on the output winding S for a binary 1, and a negative impulse is induced on the output winding S for a binary 0 stored.

Figure 3:
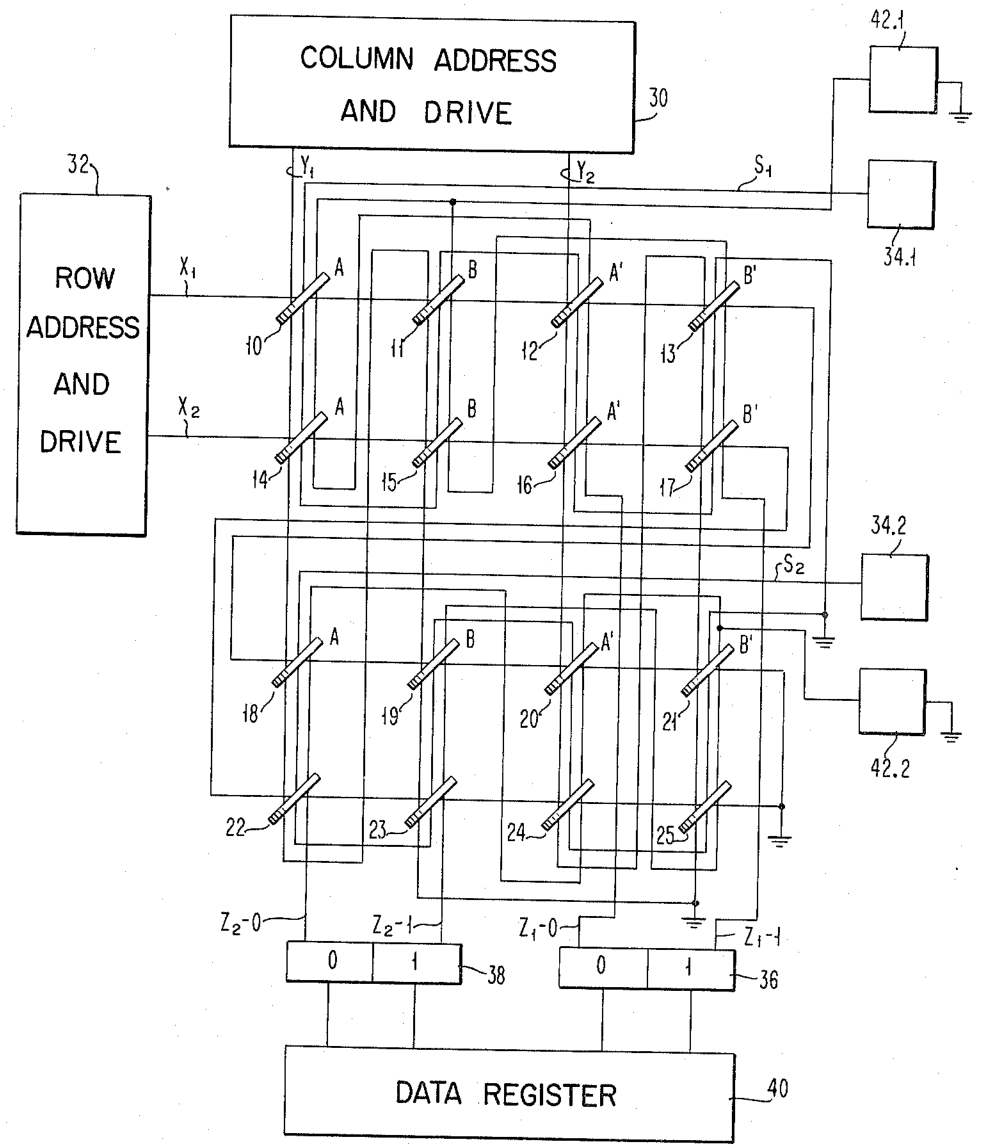
FIGURE 3 is a magnetic memory according to this invention.

Referring to the FIGURE 3, the three-dimensional memory matrix according to this invention is shown, wherein each binary storage position comprises the cell of FIGURE 1. A first plane of cores 10–17, a second plane of cores 18–25 is provided with each memory plane of cores arranged in columns and rows. Although the memory illustrated is a four word memory comprising two bits per word, the number of bits per word and/or the number of words may be increased without departing from the basic operation of the memory as shown. Alternate columns of cores in each plane of the memory are labelled A and B to point out the similarity to the basic storage cell of FIGURE 1. A plurality of row selection and drive windings X are provided each coupling all the cores in the different rows while similarly a plurality of column selection and drive windings Y are provided each coupling all the cores in both planes in a first and a succeeding column, such as the $Y_1$ winding which couples all the cores A of the first column of the first plane and all the cores A of the first column of the second plane while similarly coupling all the cores B of the second column of the first plane and all the cores B of the second column of the second plane. The column select drive windings Y are connected at one end to a column address and drive means 30 and also connected to ground at the other end, while similarly, the row selection and drive windings X are connected to a row address and drive means 32 at one end and to ground on the other end. A different sense winding $S_1$ and $S_2$ provided for each of the different planes of cores and couples each of the binary cells in either plane as is shown in the FIGURE 1, having one end connected to ground and the other to an appropriate load 34.1 and 34.2, respectively. A plurality of data input windings Z are associated with each plane of the memory. The data input winding $Z_1$–0 and $Z_1$–1 couples all the different ones of the cores in the first plane while a data input winding $Z_2$–0 and $Z_2$–1 couple all the different ones of the cores in the second plane. The $Z_1$–0 data input winding couples all the A cores in the first plane in a similar manner in accordance with the data input winding $Z_0$ shown in the FIGURE 1 while the data input winding $Z_1$–1 couples all the B cores in the first plane in a similar manner and in accordance with the $Z_1$ data input winding shown in the FIGURE 1. Similarly, the data input winding $Z_2$–0 couples all the A cores in the second plane in a similar manner in accordance with the $Z_0$ data input winding of FIGURE 1 while the $Z_2$–1 data input winding couples all the B cores in the second plane of the memory in accordance with the $Z_1$ data input winding shown in the FIGURE 1. One end of the $Z_1$–0 and $Z_1$–1 data input windings for the first plane is connected to a flip-flop 36 while similarly one end of the $Z_2$–0 and $Z_2$–1 data input windings for the second plane is connected to a flip-flop 38. The flip-flops 36 and 38 are of the bistable Eccles-Jordan trigger type which is operative to provide a positive voltage on one side or the other dependent upon the stable state in which it is operated. The different sides of the flip-flops 36 and 38 are labelled 0 and 1 in accordance with the stable states in which they are operating and their states connote the binary information to be stored in any one bit of a selected word of the memory. The state of the respective triggers 36 and 38 are in turn controlled by and connected to a data register 40, which operates to register the information word to be stored and control the state of the triggers in accordance with this information. The other ends of the respective data input lines $Z_1$–0, $Z_1$–1, $Z_2$–0 and $Z_2$–1, are connected to ground through an appropriate gating means 42 which gates the energization of the respective data input lines coincidently with the energization of the row and column select and drive windings X and Y, respectively.

Figure 4:
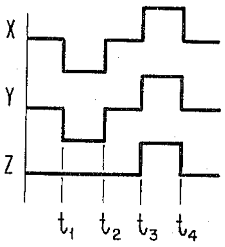
FIGURE 4 is a pulse program utilized in operation of the memory of FIGURE 3.

Referring now to the FIGURE 4, a pulse sequence for energization of the various drive lines to store and read out information in the memory of FIGURE 3 is shown. To further comprehend the operation of the memory of FIGURE 3, a typical read-write operation will hereafter be described. Assume that the word corresponding to the address location $Y_1$–$X_1$ is to be read out and information thereafter stored in this location. At a time $t_1$ in the FIGURE 4, both the $X_1$ and $Y_1$ windings are energized with negative polarity impulses. The magnetomotive force applied by energization of any one winding to any one core is $H_y$, while the magnetomotive force applied by energization of any X winding to any one core is $H_x$. The switching threshold of any one core in the memory is termed $H_0$, and the relationship $H_x=H_y<H_0$, exists while the relationship $$H_x+H_y\geqq H_0$$

also exists. Thus both the cores A and B in the first row of each plane of the memory and in the first and second column thereof have applied thereto a field equal to $(-H_x)+(-H_y)$ applied thereto which switches each of these cores to the datum stable state as is shown in the FIGURE 2. During the time interval from $t_1$ to $t_2$, the information which is to be stored in the particular word of memory has been registered in the data register 40 which in turn switches the flip-flops 36 and 38 to the stable states 1 and 0 in accordance with the binary information to be registered. Assume that the flip-flop 36 is left in the 1 state while the flip-flop 38 is in the 0 state. Although the flip-flops 36 and 38 are set in one stable state or another, they are ineffectual since the gates 42 for each of the planes are not open. After termination of the pulses to drive the X and Y lines at $t_2$, information is read into the particular word at the time $t_3$ by coincidently energizing the $X_1$, $Y_1$ and Z data windings by opening of the gates 42. The $X_1$ and $Y_1$ select drive windings are energized by positive impulses to apply a magnetomotive force of $H_y+H_x$ to the cores 10, 11, 18 and 19 which are the cores A and B coupled by both these selection windings in both planes. The field applied to these cores by the select and drive windings $X_1$ and $Y_1$ is sufficient to drive both cores of each bit location to the P stable state as indicated in the FIGURE 2, however, the data input lines $Z_1$–1 and $Z_2$–0 are energized at this time so that the core 11 has a total magnetomotive force of $H_x+H_y-H_z$ while similarly the core 18 has a similar magnetomotive force applied thereto. Thus the cores 10 and 19 switch to the P stable state while the cores 11 and 18 switch to the N stable state as is shown in the FIGURE 2. The cores 10 and 11 which make up a single bit storage cell for the memory are then left at the time $t_4$ in the P and N stable states respectively, designating a binary 1 stored, while the cores 18 and 19 are left in the N and P stable states, respectively, to designate a binary 0 stored.

The information previously stored in a word location, is read out as described above, by energization of $X_1$ and $Y_1$ select and drive windings to re-establish the cores in the datum stable state. As described with reference to the FIGURE 1, since the core 10 is in the P stable state while the core 11 is in the N stable state switching of these cores to the datum stable state provides a positive voltage on the output winding $S_1$ while a negative voltage is applied to the output winding $S_2$ since the core 18 is in the N stable state and the core 19 is in the P stable state when switched to the datum stable state.

Employing partially switched states of two cores for each binary bit of information as discussed above, has the advantage in the embodiment of FIGURE 3 of avoiding delta noise signals. As described in a U.S. Patent 2,881,414, issued to M. K. Haynes, for a "Magnetic Memory System," which is assigned to the assignee of this application, when a core is established in a partially switched remanent state, application of half select signals to the core causes a minor excursion and hence a minor flux change in the core, with re-establishment of the flux in the same minor or disturbed remanent stable state. Hence, the partially switched remanent states P and N as indicated in the FIGURE 2 of both cores A and B are selected such that application of an applied field by any one of the coordinate address lines X and Y, causes a minor excursion from the particular remanent state P or N and thence back to the same remanent state. Both cores experience the same amount of flux change and therefore induce a similar voltage on the particular sense winding S coupling these cores. Since the sense winding S couples both cores A and B in opposition, the flux change in these cores caused by half select signal is cancelled. Consider, for example, selection of the cores 10 and 11 and 18 and 19 as set forth above. During the time $t_1$ to $t_2$, the $X_1$ row drive winding is energized to apply an M.M.F. to the cores 10–13 and 18–21, while coincidently if the $Y_1$ column drive line is energized to apply an M.M.F. to the cores 10, 11, 14, 15, 18, 19, 22 and 23. Since the cores 10, 11, 18 and 19 are coincidently energized by both the $X_1$ and $Y_1$ drive windings as discussed above, these cores are completely reset to the datum stable state. The remaining cores are half-selected such that any core in the B state is driven toward the datum state providing a negative flux change and thereafter returns to the same P stable state, while similarly any core in the N stable state is switched towards the datum stable state providing a negative flux change to thereafter return to the N stable state. The sense line $S_1$ in the FIGURE 3 has induced therein voltages due to the flux changes in the cores 10–15. The sense winding $S_1$ couples the cores 12 and

14 in one sense and the cores 13 and 15 in an opposite sense and since the flux changes induced in the cores 12–15 are of similar magnitude and direction, the signals and hence voltages induced in the sense winding $S_1$ due to flux changes in these cores substantially cancel while similarly the voltages induced by the switching of the cores 10 and 11 to the datum stable state buck and tend to cancel out with the result that either a positive or negative voltage appears at the load 34.1 determined by which one of the cores 10 or 11 was previously in the P stable state. Similarly, the sense winding $S_2$ for the second plane of cores provides an output pulse to the load 34.2 determined by which one of the cores 18 or 19 was originally in the P stable state and the negative flux excursions due to half-selects energizing the cores 14–23 are cancelled.

While the invention has been particularly shown and described with reference to a preferred embodiment thereof, it will be understood by those skilled in the art that various changes in form and details may be made therein without departing from the spirit and scope of the invention.

What is claimed is:

1. A three dimensional memory comprising a plurality of stacked two dimensional planes, each plane comprising a plurality of magnetic storage cells arranged in columns and rows, a plurality of column conductors each coupling all the cells in different columns, a plurality of row conductors each coupling all the cells in different rows, a common sense winding, each said cell comprising a first and a second core made of magnetic material exhibiting different stable states of flux remanence intermediate and including opposite limiting stable states, a first data input winding coupling all the first cores of said cells and a second data input winding coupling all the second cores of said cells, means comprising first means connected to said row conductors and second means connected to said column conductors for coincidently energizing a selected row and column conductor whereby each core of the cells of said memory coupled thereby is switched toward a first intermediate stable state, third means coincidently operative with said first means for selectively energizing one of the data input windings of each plaine of said memory to cause the core of a selected cell in each plane of said memory coupled by the selected data input winding to assume a second intermediate stable state whereby the different intermediate stable states assumed by both cores of each cell define a stored binary value, said first and second means including further means for thereafter coincidently energizing said selected row and column conductors to establish both cores of each storage cell coupled thereby in a datum limiting stable state whereby the information retained in each cell is manifested in the sense line coupled thereto and distinguished by a difference in polarity.

2. A three dimensional memory comprising a plurality of stacked two dimensional planes; each plane comprising a plurality of storage cells arranged in columns and rows; a plurality of column conductors each coupling all the cells in different columns; a plurality of row conductors each coupling all the cells in different rows; a common sense winding coupling all said cells; each said cell comprising, a first and second magnetic core made of magnetic material exhibiting a first, a second and a third stable remanent state, wherein at least one of said stable states is a limiting stable state and another of said stable states is an intermediate stable state; a first data input winding coupling all the first cores of said cells; a second data input winding coulping all the second cores of said cells; means for writing binary information into said memory and for reading out said information comprising, first means connected to said column conductors and second means connected to said row conductors and third means connected to said first and second data input windings for coincidently energizing a selected pair of row and column conductors and a selected one of said data input windings for establishing the first core of a selected cell in the first stable state and the second core of the selected cell in the second stable state to thereby store a binary value, said first and second means including means for thereafter coincidently energizing said selected row and column conductors in opposite sense to establish both cores of the selected cell in the third stable state to thereby read out the information retained therein.

3. Apparatus for registering pulse information magnetically by the transmission of electrical impulses comprising a plurality of storage cells each including a first and a second magnetic core made of material exhibiting different stable states of flux remanence intermediate and including opposite limiting stable states, both cores of each cell coupled by a plurality of windings including a pair of data input windings respectively coupling a different core of each cell and a common sense winding, means comprising first means connected to one of said windings of each said cell and second means connected to another of said windings of each said cell for selectively applying said impulses coincidently to said one and said another of said plurality of windings and jointly switch both cores of a selected cell toward a first intermediate stable state, third means for selectively applying another of said impulses to a selected one of said pair of data input windings coincidently with the operation of said first and second means to establish one core of said selected cell in a second intermediate stable state whereby the different intermediate states assumed by the cores of the selected cell jointly define a stored binary value, said first means including means for thereafter applying said impulses in opposite sense simultaneously to said selected one winding and another winding of the selected cell to jointly establish both cores of the selected cell in a datum limiting stable state whereby the information retained in the cell is read out and distinguished by a difference in polarity induced on said sense winding.

4. Apparatus for registering pulse information magnetically by the transmission of electrical impulses comprising a plurality of storage cells, each said storage cell comprising a first and a second core made of magnetic material exhibiting a first, a second and a third stable state of flux remanence, wherein at least one of said stable states is a limiting stable state and another of said stable states is an intermediate stable state, a plurality of windings coupling each core of each cell including a pair of data input windings respectively coupling a different core of each cell and a common sense winding, means comprising a first means connected to one winding of each said cell, second means connected to a different winding of each said cell, and third means connected to said pair of data input windings of each said cell for selectively applying said impulses coincidently to said one and said different windings of a selected cell and one of said data input windings to jointly switch the first core of a selected cell to the first stable state and the second core of the selected cell to the second stable state and thereby define and store a particular binary value, said first and second means including further means for thereafter coincidently applying said impluses in opposite sense to said selected pair of windings only to jointly establish both cores of the selected cell in the third stable state whereby the information retained in the selected cell is read out as an induced impulse on said sense winding.

5. In a memory for storing binary values, a plurality of storage cells each comprising a first and a second magnetic core made of material exhibiting different stable states of flux remanence intermediate and including opposite limiting stable states, a pair of input windings coupling both cores of said cell in a similar sense, an output winding coupling said cores in series opposition, a first data input winding coupling said first core only and a second data input winding coupling said second core only, means comprising first means connected to one of said pair of input windings of each cell and second means connected to the other of said pair of input windings of each cell for coincidently energizing a selected pair of input windings and jointly switch both cores of a selected cell toward a first intermediate stable state, third means for selectively energizing one of said data input windings coincidently with the operation of said first means to establish the core of the selected cell coupled thereby in a second intermediate stable state whereby the different intermediate states assumed by said cores jointly define a binary value for said cell, said first and second means including further means for thereafter coincidently energizing said selected pair of input windings to establish both cores of the selected cell in a datum limiting stable state whereby said cell is read out and the information retained therein is manifested by an impulse on said output winding.

6. In a memory for storing binary values, a plurality of binary storage cells each comprising a first and a second magnetic core made of material exhibiting a first, a second and a third stable state of flux remanence wherein at least one of said stable states is a limiting stable state and another of said stable states an intermediate stable state, a pair of input windings coupling both said cores in a similar sense, an output winding coupling said core in series opposition, a first data input winding coupling said first core only and a second data input winding coupling said second core only, means comprising, first means connected to one of said pair of input windings of each cell, second means connected to the other of said pair of input windings of each cell, and third means connected to said first and second data input windings of each cell for coincidently energizing a selected pair of input windings and a selected one of said data input windings for establishing said first core of a selected cell in said first stable state and said second core in said second stable state whereby the different states assumed by both said cores jointly defines a binary value, said first and second means including further means for coincidently energizing said selected pair of input windings only to establish both cores of said cell in the third stable state whereby said cell is read out and the information retained therein is manifested as an impulse on said output winding.

References Cited by the Applicant

Publication I: "Electronic Engineering," December 1959, pages 756 to 758, #139B.

Publication II: "International Solid State Circuits Conference," February 11, 1960, pages 58, 59.

Publication III: "IBM Technical Disclosure Bulletin," vol. 2, No. 4, December 1959, pages 106, 107, #143.

Publication IV: "IBM Technical Disclosure Bulletin," vol. 3, No. 10, March 1961, pages 107, 108, #210.

Publication V: "IBM Technical Disclosure Bulletin," vol. 3, No. 10, March 1961, pages 109, 110, #211.

IRVING L. SRAGOW, *Primary Examiner.*

JOHN F. BURNS, *Examiner.*